(12) United States Patent
Hubert

(10) Patent No.: US 6,366,949 B1
(45) Date of Patent: Apr. 2, 2002

(54) METHOD AND ARRANGEMENT RELATING TO COMMUNICATION IN A NETWORK

(75) Inventor: Johannes Hubert, Västra Frlölunda (SE)

(73) Assignee: Maila Nordic AB, Stockholm (SE)

( * ) Notice: Subject to any disclaimer, the term of this patent is extended or adjusted under 35 U.S.C. 154(b) by 0 days.

(21) Appl. No.: 09/126,055

(22) Filed: Jul. 30, 1998

(51) Int. Cl.[7] .............................................. G06F 13/00
(52) U.S. Cl. ...................................... 709/206; 709/203
(58) Field of Search ................................. 709/206, 203

(56) References Cited

U.S. PATENT DOCUMENTS

| | | | | |
|---|---|---|---|---|
| 5,771,355 A | * | 6/1998 | Kuzma | 709/232 |
| 5,781,901 A | * | 7/1998 | Kuzma | 707/10 |
| 5,899,990 A | | 5/1999 | Maritzen et al. | 707/4 |
| 5,953,528 A | * | 9/1999 | Sullivan | 717/3 |
| 6,014,688 A | * | 1/2000 | Venkatraman et al. | 709/206 |
| 6,014,689 A | * | 1/2000 | Budge et al. | 709/206 |
| 6,131,116 A | * | 10/2000 | Riggins et al. | 709/219 |

FOREIGN PATENT DOCUMENTS

| | | |
|---|---|---|
| EP | 0 818 742 A1 | 1/1998 |
| WO | WO 98/37486 | 8/1998 |
| WO | WO 99/22322 | 5/1999 |

OTHER PUBLICATIONS

Research Disclosure, vol. No. 462, Apr. 1998, IBM Corp. 408144, "Java Applet Attached to E–Mail".
Research Disclosure, vol. 41, No. 410, Jun. 1998, IBM Corp. NNRD410120, "Java Applet Attached to E–Mail".

* cited by examiner

Primary Examiner—Kenneth R. Coulter
(74) Attorney, Agent, or Firm—Oppedahl & Larson LLP

(57) ABSTRACT

The present invention refers to an arrangement for transferring data through a computer network including at least one transmitting client and one receiving client, said data being arranged in an E-mail, specially a HTML E-mail. The arrangement further comprises a server unit including means to store managing programmes. The E-mail further including at least one attachment information, including a pointer to said server and said managing programmes for executing and processing said attachment information.

18 Claims, 2 Drawing Sheets

METHOD AND ARRANGEMENT RELATING TO COMMUNICATION IN A NETWORK

TECHNICAL FIELD OF THE INVENTION

The present invention relates to an arrangement for transferring data through a computer network, including at least one transmitting client and receiving client, said data being arranged in an E-mail, especially a HTML E-mail.

The invention also refers to a method for arranging a HTML E-mail.

BACKGROUND OF THE INVENTION

When transferring information from a sender to a receiver through the Internet and similar communication networks different techniques, formats and protocols are used. A specifically standardised method for such an information transfer is to use E-mail. A message containing only textual information is produced in a computer program, to which different types of attachments or enclosures that can be transferred separately are added or included in an aggregate mail. The message is transferred through the communication network, and it is then available on the receiving side by executing a computer program corresponding to the program used at the transmitting side, that is a program interpreting the message as intended by the sender. If the message contains only textual information, it is directly readable by means of the computer program at the receiving side. The receiver program may be referred to as a user agent.

One type of attachment is a document that has been formatted in a word processing program and another type is images or drawings that have been formatted correspondingly in a design program or similar software. Presently available software at the receiving side will separate optional attachments and some information about them, such as the file name of the attachment, will be available. On the condition that a computer program corresponding to the program that produced the document, which is capable of interpreting the document as intended by the sender, is available also at the receiving side it is possible to start such a program and open the document, thereby making the content of the attachment document readable. Only on the condition that the program at the receiving side completely corresponds to the program used at the sending side for generating the document, normally with respect to the version of the program as well as to the platform on which the program is run, all information will be available to the receiver in the correct format. In this context platform is used for the type of computer or processor as well as the operating system used.

It is also known to include an executable program in an attachment, such as an executable WINDOWS™ program. In such a case the attached program is started separately. Also in this case it is imperative that the same platform is used, or that the sender has a sufficient knowledge about the platform used by the receiver, so as to allow the attached program to start in a correct way.

A standard used for transferring information that is more complex than plain text is MIME (Multipurpose Internet Mail Extension). Within the scope of MIME the encoding, transfer and decoding of different types of documents within an Internet Mail are defined. A MIMEencoded message contains a Content-Type Header Field which declares the type of data and which is added by a User Agent of the Sender. This end of header fields is used by a User Agent of the Recipient to identify the document type.

One type of document that can be transferred through is a hypertext document that is displayed, for example by web browsers or other E-mail client programs. Such documents are formatted in HTML (HyperText Markup Language).

The elements, such as the structure, standards and protocols, of an Internet Mail are defined in a plurality of documents called RFC:s (Request For Comments). According to existing RFC:s different types of attachments are allowed. A user agent, which is a mail program, of the recipient optionally may have a capability of extracting attachments of a mail object. Different RFC:s are applicable with regard to the invention.

One drawback inherent in the embodiments mentioned above is that one common platform or at least platforms that are carefully adapted to each other have to be used, so as to obtain the desired function. There also are strong limitations with regard to the level of automating when the information is received. Software required to interpret and display the information as intended by the sender has to be present or downloaded and started separately. New mail functionality implies repeated modifications of existing standards. Without such modifications the flexibility will be poor. The sender normally cannot control how the information sent will be interpreted or displayed by the receiver.

Still, there is a desire to deliver Java-based e-mails (mail objects) to a receiver, without demanding any special software (except for a Java capable e-mail client) on the receiving side, to process the attached information.

This can be achieved by sending a HTML formatted e-mail which contains a so-called applet-tag. Through this tag a Java applet is embedded into the HTML page. The Java capable e-mail client at the receiver's side will automatically start the applet when the e-mail is viewed.

However, some problems appear when a HTML page containing an applet is sent via e-mail as the Java code itself (the Java class files) must also be delivered to the E-mail receiver. Also the additional user data which is used by the applet (e.g. image-data, sound-data, color-information, information about animation etc.) must be transported somehow.

A simple solution would be to pac all the applet files and all user data into a so-called e-mail attachment which will be attached to the HTML e-mail and send the package. However, this solution does not work on all e-mail systems, since many Java capable E-mail clients do not allow the starting of an applet from inside a HTML e-mail, if the class files for that applet are embedded in an attachment of that same e-mail.

SUMMARY OF THE INVENTION

The main object of the present invention is to overcome problems set out above, by providing a method and arrangement to deliver E-mails in a secure and simple way, yet allowing complex data to be attached to the E-mail without a need for advanced programs to process and/or present the e-mail attachment.

Another object of the invention is to provide a method and arrangement for data transfer with a higher level of applicability.

For these reasons the arrangement according to the inventions is characterised in that said arrangement further comprises a server unit including means to store managing programmes, and said E-mail further includes at least one attachment information, including a pointer to said server and said managing programmes for executing and processing said attachment information.

Preferably, said attachment information includes a JAVA applet parameter list, said managing programmes include JAVA applet class files and said means to store managing programmes also includes user-data.

The network arrangement according to the invention may be Internet or intranet, and attachment information includes a Uniform Resource Locator (URL), from which an applet can be started. The URL provides a standard, hierarchical way of identifying and locating Internet resources on a World Wide Web. In an embodiment said URL may be generated dynamically using data from the user, type of E-mail, attached information etc.

Preferably said class files are generic and usable by E-mails of different kind. The class files may also be small files allowing fast download. Advantageously, the class files are compressed and saved as Java Archive (JAR) files. Said JAR files are an archive option in the applet code of a HTML-page.

It is also desirable to cache said class files in an e-mail program and/or one load them in a client specific location. The user-data in an applet parameter can be encrypted. The user-data of the class files can be coded into the user-data, eliminating the frequent need of residing all class files on the server.

According to a method of the invention an E-mail is arranged, specially a HTML E-mail, comprising at least one attachment information, including user-data, having a pointer to a server including means to store managing programmes in form of JAVA applet class files, for executing said attachment information. The method comprises the steps of: storing said class files in a database of said server, combining user-data into a data array, packing said data array, coding said data array, converting said data array into a client program compatible string, and using said client program compatible string as an input parameter to a Java applet.

BRIEF DESCRIPTION OF THE DRAWINGS

The invention will in the following be further described in non-limiting way under reference to the accompanying drawings in which.

DETAILED DESCRIPTION OF THE EMBODIMENT

Figure 1:
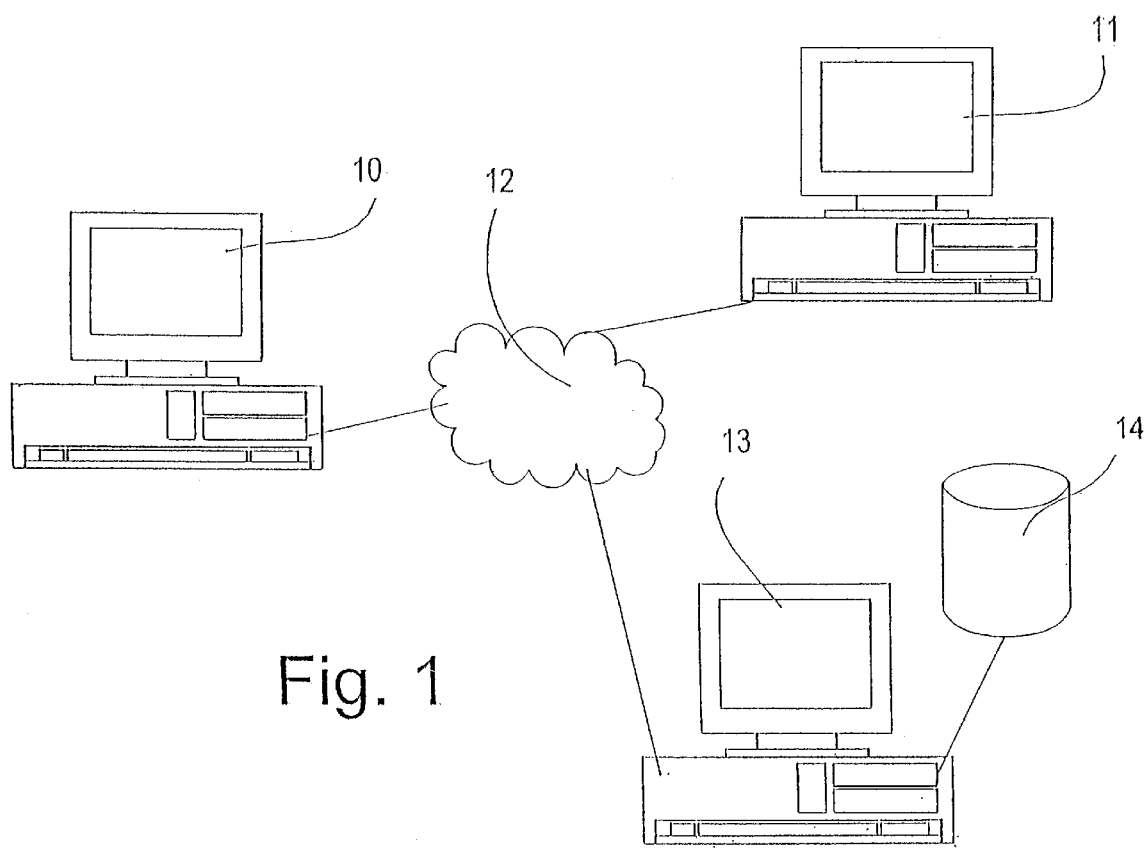
FIG. 1 schematically illustrates a network according to the invention

A communications network implementing an embodiment of the invention is illustrated in FIG. 1, including at least one transmitting client station 10, receiving client station 11, a network arrangement 12 and a server arrangement 13.

The network arrangement 12 is preferably Internet and/or intranet through which the transmitting client station 10 can send an E-mail, preferably a HTML E-mail, to the receiving station 11.

The server arrangement 13 includes a database 14, on which managing programmes for processing the attachment information, e.g. applet class files are stored. Preferably, the server has known Uniform Resource Locator (URL) and from it an applet can be started. URLs generally provide a standard, hierarchical way of identifying and locating Internet resources on the World Wide Web and include letters, numbers, and punctuation. The first section of a URL specifies the type of resource to be accessed and the protocol to be used to transmit the resource, for example HTTP. The remainder of the URL indicates the name of the computer and its domain, the port number and often includes the directory path and file name for a specific resource. Obviously, the URL may be arranged dynamically and generated using data from the user, type of E-mail, attached information etc.

In some systems the applets cannot access the user data (e.g. images, sound etc.) attached to the HTML e-mail either.

To overcome the said problem, also the user-data can be stored on the server. To prevent security risks, a Java applet is usually not allowed to access any data that is stored on a server different from the server the applet classes are stored on.

Figure 2:
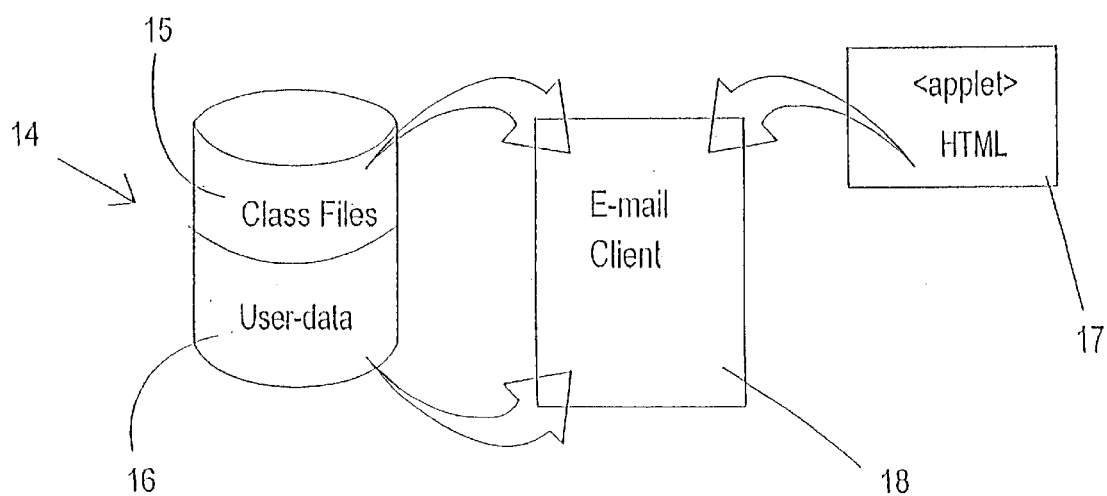
FIG. 2 is a block diagram illustrating structure of an e-mail according to a first embodiment of the invention.

In one embodiment, it is possible to store both the applet classes 15 and the user-data 16 on the server, as shown in FIG. 2. The applet 17 uses the stored information on the database to display the message of the E-mail 18. It means obviously that clients who only want to send, for example private messages, e.g. holiday greetings, would need to set up a web-server with classes and user-data or subscribe to one from an Internet provider by establishing one or several central servers with the class files, to remove the need for all the clients to have their own web-servers.

Because of the limitation mentioned above, i.e. the data can only be accessed on the same server that the class files are stored on, the result is that if a client wants to send an applet enabled E-mail, first the user-data must be transferred to a server. If the client doesn't want to store private communication data accessible by other users on a server then they may encrypt the data. Then it is possible that the user-data cannot be removed from the central server, because as soon as it is removed, the mail cannot be viewed or read by the receiver later.

In a preferred embodiment, for separately sending the class files and the user-data, so that the class-files can be published on a server, but the user-data can be sent with each individual E-mail, the applet parameters are used. An applet can be provided with a number of parameters. The parameters are provided to supply the applet with specific information, so that reusing the same applet for slightly different applications becomes easier.

For example: An applet can use a parameter to set a background color to a specified value. Thus, the same applet can be reused in HTML pages with different background colors, without the need to rewrite the applet: the background color is simply provided as a parameter. A parameter can contain any character string of theoretically unlimited length.

Figure 3:
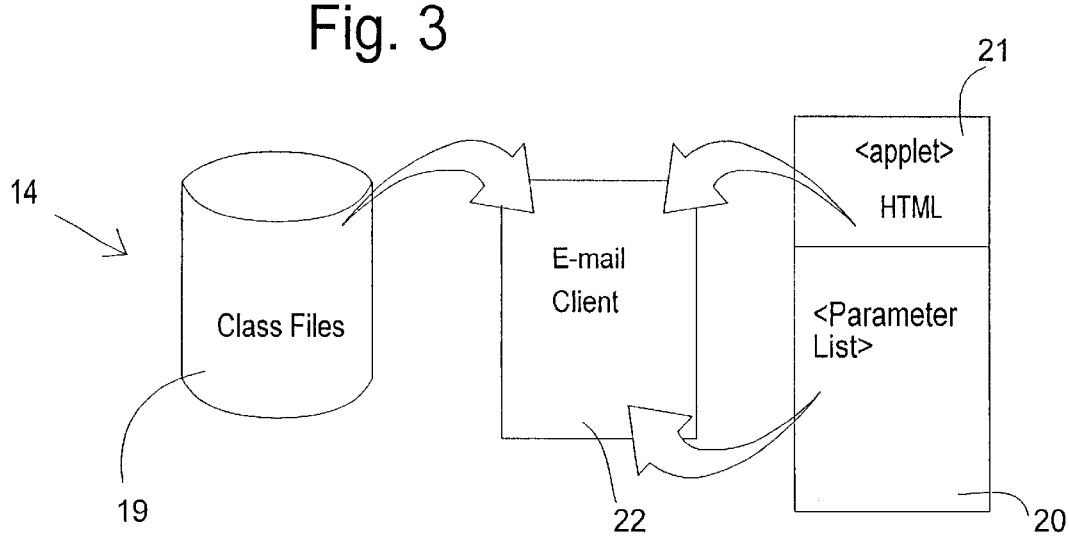
FIG. 3 is a block diagram illustrating structure of an e-mail according to a second embodiment of the invention.

Consequently, classes and additional user-data are separated in the following way, as shown FIG. 3:

In a database 14 of at least one server 13, Class Server (CS), the classes 19 are stored, from where they can be accessed by any client. The additional user-data is first combined into one large data array 20. This data array is then packed and coded and converted into a HTML compatible string. This string is used as an input parameter to the Java applet 21. Since an applet parameter is part of the HTML mail that starts the applet, this parameter (and preferably all user-data) is written directly into the HTML E-mail 22 and sent to the receiver. The reference to the classes is achieved by specifying a so-called code base in the applet parameter in the HTML code. The code base is the pointer to a CS's URL.

The HTML source code of a HTML page attached to an E-mail created according to the invention may appear as following:

```
<HTML>
<HEAD>
<META HTTP-EQUIV="Content-Type" CONTENT=
    "text/html; charset=Iso-8859-1">
<TITLE></TITLE>
<HEAD>
<BODY><P>
<APPLET CODE="[CLASS DEFINITION]
    "CODEBASE="[ADRESS OF CLASS FILES]">
<PARAM NAME="data" VALUE="[PARAMETER
    LIST]">
</APPLET></P>
</BODY>
</HTML>
```

The term "xxxxx" denotes insertable parameters and text between the brackets refers to the function definitions.

The classes on the server are generic enough, so that the Java enabled (for example animated) E-mails of different kind can be presented utilising them. Advantageously, there is not one class for each possible E-mail type, but instead a number of generic ones, which use a well defined set of instructions to determine how a specific E-mail appears. Instead of writing a special class for an e-mail that contains an animated object, for example, a generic class which can handle all types of animation movements can be used and it is supplied with the information about the movement (start, end, duration etc.) from the user-data that is transferred to the class via the applet parameter. Preferably, the class files are small files allowing fast download to the client site. It is also possible to save time by compressing and saving the class files as Java ARchive (JAR) files. These can later be used with an archive option in the applet code of the HTML-page. It may be advantageous as there is a separate connection to the CS for each required class but only one connection for transferring the JAR file. To obtain better security and control, only one administrator is needed for producing and maintaining the class files for specific set of E-mails.

In one embodiment, it is possible to cache the class files in a mail program to speed up the downloads and processing. It is also possible to once download all class files to the client specific location (e.g. clients station) to speed up the program execution. In this case the files can be updated if they are changed.

The use of a user-data block in the applet parameter, also provides for encryption of the user-data: The data is not only kept confidential because it is directly sent to the receiver like a normal e-mail and it is not stored on a public server, but it can also be made even more safe through encryption.

Moreover, with developing technology, some of the class files can be coded into the user-data, eliminating the frequent need of residing all class files on the server. Instead the user will have the option to augment the Java applet with custom classes.

The invention is not limited the shown embodiments but can be varied in a number of ways without departing from the scope of the appended claims and the arrangement and the method can be implemented in various ways depending on application, functional units, needs and requirements etc. The invention is not limited to JAVA and other programming languages other than JAVA, e.g. J++, C++ etc. may also be used

What we claim is:

1. An arrangement for transferring data through a computer network including at least one transmitting client and one receiving client, said data being arranged in an E-mail, especially an HTML E-mail, wherein:

said arrangement further comprises a server unit including means to store managing programs, and said E-mail further includes at least one attachment information, including a pointer to said server and said managing programs for executing and processing said attachment information by means of said managing programs.

2. An arrangement according to claim 1, wherein said attachment information includes a JAVA applet parameter list.

3. An arrangement according to claim 1, wherein said managing programmes include JAVA applet class files.

4. An arrangement according to claim 1, wherein said means to store managing programmes also includes user-data.

5. An arrangement according to claim 1, wherein said network arrangement is Internet or intranet.

6. An arrangement according to claim 1, wherein said attachment information includes a Uniform Resource Locator (URL), from which an applet can be started.

7. An arrangement according to claim 6, wherein said URL provides a standard, hierarchical way of identifying and locating Internet resources on a World Wide Web.

8. An arrangement according to claim 6, wherein said URL is generated dynamically using data from the user, type of E-mail, attached information etc.

9. An arrangement according to claim 3, wherein said class files are generic and usable by E-mails of different kind.

10. An arrangement according to claim 3, wherein said class files are small files allowing fast download.

11. An arrangement according to claim 3, wherein said class files are cached in an e-mail program.

12. An arrangement according to claim 3, wherein said class files are once loaded in a client specific location.

13. An arrangement according to claim 4, wherein said user-data in an applet parameter is encrypted.

14. An arrangement according to claim 3, wherein said user-data of the class files is coded into the user-data, eliminating the frequent need of residing all class files on the server.

15. An arrangement according to claim 4, wherein said user-data of the class files is coded into the user-data, eliminating the frequent need of residing all class files on the server.

16. An arrangement for transferring data through a computer network including at least one transmitting client and one receiving client, said data being arranged in an E-mail, especially an HTML e-mail, wherein:

said arrangement further comprises a server unit including means to store managing programs, and said E-mail further includes at least one attachment information, including a pointer to said server and said managing programs for executing and processing said attachment information by means of said managing programs, wherein said managing programs include JAVA applet class files and said class files are compressed and saved as JAVA Archive (JAR) files.

17. An arrangement according to claim 16, wherein said JAR files are an archive option in the applet code of a HTML-page.

18. A method of arranging an E-mail, especially an HTML E-mail, comprising at least one attachment information, including user-data, having a pointer to a server including means to store managing programs in form of JAVA applet class files, for executing said attachment information, wherein the method comprises the steps of:

storing said class files in a database of said server, combining user-data into a data array, packing said data array, coding said data array, converting said data array into a client program compatible string, and using said client program compatible string as an input parameter to a JAVA applet.

* * * * *